United States Patent [19]

Vasilchenko

[11] Patent Number: 4,620,464

[45] Date of Patent: Nov. 4, 1986

[54] BORING HEAD

[76] Inventor: Georgy A. Vasilchenko, ulitsa Khersonskaya 1, kv. 103, Moscow, U.S.S.R.

[21] Appl. No.: 641,014

[22] Filed: Aug. 15, 1984

[51] Int. Cl.[4] .............................................. B23B 43/00
[52] U.S. Cl. ......................................... 82/1.2; 82/2 E
[58] Field of Search .................. 82/1.2, 2 E, 2 A, 2 R

[56] References Cited

U.S. PATENT DOCUMENTS 4,067,251  1/1978  Eckle et al. ............................ 82/1.2

FOREIGN PATENT DOCUMENTS 665994  6/1979  U.S.S.R. .

*Primary Examiner*—Leonidas Vlachos
*Attorney, Agent, or Firm*—Lilling & Greenspan

[57] ABSTRACT

A boring head of a multiple-operation machine tool comprises a housing which is kinematically coupled to a spindle and adapted to accommodate a carriage spring-biased against the housing, carrying a mandrel for a cutting tool and having a slanted surface to interact with a slanted surface of a rod arranged in the housing coaxially with the latter and kinematically coupled to a drive which moves it in the axial direction. The boring head also incorporates a counterbalance comprising at least a pair of pins received in through holes provided in the carriage. The holes are symmetrical with respect to the axis of rotation of the boring head and extend at a perpendicular to said axis of rotation. The pins are kinematically coupled to the rod so that they can reciprocate in the through holes of the carriage.

3 Claims, 4 Drawing Figures

BORING HEAD

FIELD OF THE INVENTION

The present invention relates to the manufacture of machine tools and is more specifically concerned with boring heads of multiple-operation machine tools.

Boring heads in accordance with the invention are best applicable to multiple-operation machine tools with an automatic change of cutting tools, which are used to machine holes of different cross-sectional shapes.

BACKGROUND OF THE INVENTION

There is known a boring head for facing operations (cf. B. M. Bromberg et al., Almazno-rastochnye stanki /Diamond Boring Machines/, Machinostronie Publishers, Moscow, 1965, p. 83), comprising a housing which is kinematically coupled to a spindle and accommodates a counterbalance and a carriage carrying a mandrel for a cutting tool. The housing also accommodates a rod coaxial with the former and kinematically coupled to a drive which moves the rod in the axial direction. The rod is constructed as a frame interacting with the carriage and counterbalance. The carriage and counterbalance are radially movable in the opposite directions by means of helical racks provided on the lateral sides of the rod and meshed with corresponding helical racks provided on the carriage and counterbalance. The helical racks are such that the carriage and counterbalance cover equal distances as they move in opposite directions with their masses being equal. As the spindle is set in rotation, the carriage and counter-balance are acted upon by their own centrifugal forces which also act on the rod, producing a twisting moment. The latter causes some deformation of the rod and a certain amount of play which affects the machining accuracy. In addition, the boring head in question is disadvantageous in its relatively great weight and size due to the presence of the counterbalance received in a special groove provided in the housing.

There is also known a boring head of a multiple-operation machine tool, which is the prototype of the present invention. This boring head comprises a housing kinematically coupled to a spindle and adapted to accommodate a carriage which carries a mandrel for a cutting tool and has three slanted surfaces. One of these interacts with a slanted surface of a rod arranged in the housing coaxially with the latter and kinematically coupled to a drive which moves it in the axial direction. The two other slanted surfaces are symmetrically arranged in relation to the axis of rotation of the boring head and interact with rollers whose axles are perpendicular to the axis of rotation of the boring head and secured at the ends of a fork spring-loaded against the carriage. The fork is coaxial with the housing. The rollers interact with the slanted surfaces on lines found in a plane extending through the axis of rotation of the boring head (cf. USSR Inventor's Certificate No. 665,994). The carriage is displaced in relation to the axis of the boring head. As the boring head rotates, a centrifugal force is produced, which is directed at a perpendicular to the axis of rotation. This force bends the housing of the boring head and the spindle and increases the load on the spindle bearings. At a low spindle speed, this force does not tangibly affect the accuracy of machining, but a low spindle speed means a low efficiency of the machine tool. Raising the spindle speed in order to raise the efficiency produces a centrifugal force which bends the housing and the spindle and causes contact deformations in the spindle bearings. These factors affect the accuracy with regard to the diameter of machined holes and make them assymetrical due to a non-uniform rigidity of the spindle bearings in different directions relative to the workpiece.

SUMMARY OF THE INVENTION

It is an object of the present invention to improve the accuracy of machining at an increased spindle speed, i.e., raise the efficiency of boring machines.

The invention provides a boring head of a multiple-operation machine tool, comprising a housing which is kinematically coupled to a spindle and accommodates a carriage spring-loaded against the housing, carrying a mandrel for a cutting tool and having a slanted surface to interact with a slanted surface of a rod arranged in the housing coaxially with the latter and kinematically coupled to a drive which moves the rod in the axial direction, characterized in that it incorporates a counterbalance composed of at least a pair of pins received in through holes provided in the carriage, symmetrically arranged in relation to of the boring head and extending at a perpendicular to said axis of rotation, the pins being kinematically connected to the rod so that they can reciprocate in the through holes.

It is preferred that the pins be kinematically coupled to the rod by means of helical racks provided on the pins and on the opposite lateral surfaces of the rod.

This type of kinematic coupling is the simplest and does not call for increasing the size of the boring head.

It is also preferred that the gear ratio of the interacting slanted surface of the rod and the carriage be much lower than that of the interacting helical racks of the pins and the rod. This is an essential provision for a compact boring head, because the counterbalance may be lighter by several times than the carriage.

The counterbalance eliminates the forces bending the housing and the spindle, considerably reduces the load on the spindle bearings, rules out the twisting moment acting on the rod, and thus makes it possible to increase the spindle speed.

Unlike conventional boring heads, the head according to the invention is simple in design, light and compact, which is due to reducing the weight of the counterbalance and arranging it in the carriage casing. The above advantages of the boring head in accordance with the invention provide for a higher machining accuracy and a higher efficiency of boring machines.

BRIEF DESCRIPTION OF THE DRAWINGS

Other objects and advantages of the present invention will become more apparent from a consideration of the following detailed description of a preferred embodiment thereof, taken in conjunction with the accompanying drawings, wherein.

DETAILED DESCRIPTION OF THE INVENTION

Figure 1:
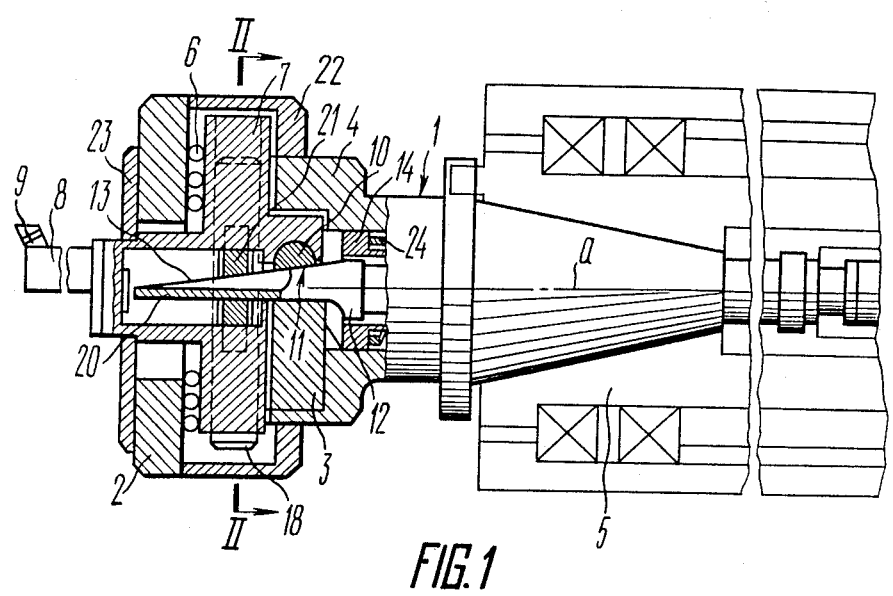
FIG. 1 is a side elevational view in partial cross-section of a boring head.

Referring to the attached drawings, the boring head of a multiple-operation machine tool comprises a housing 1 (FIG. 1) having a cheek 2, a block 3, and a mandrel 4 which are rigidly attached to one another. The mandrel 4 is corrected to a spindle 5. The housing 1 accommodates rolling contact bearings 6 in which there is mounted a carriage 7 carrying a mandrel 8 for a cutting tool 9.

The carriage 7 accommodates a cylindrical finger 10 with a flat surface which serves as a slanted surface 11 of said carriage 7. The housing 1 further accommodates a rod 12 which is coaxial with the former. One end of the rod 12 is kinematically coupled to a drive (not shown) which moves the rod 12 in the axial direction. The opposite end of the rod 12 is a slanted surface 13 which interacts with the slanted surface 11 of the carriage 7.

Figure 2:
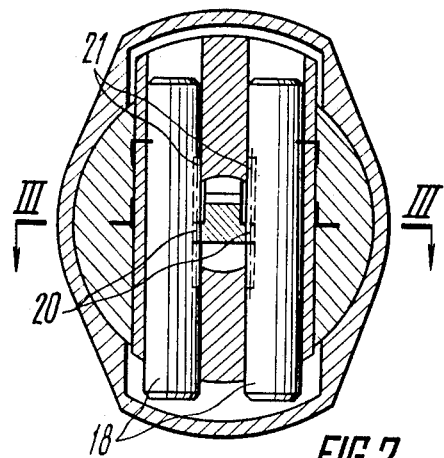
FIG. 2 is a cross-sectional view taken along lines II—II in FIG. 1.
Figure 4:
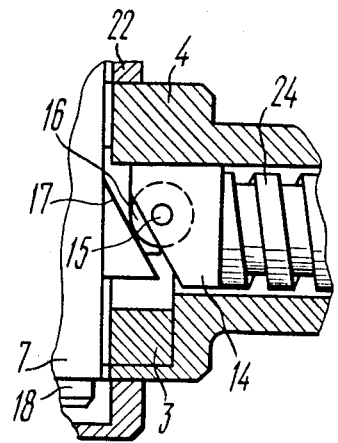
FIG. 4 is a cross-sectional view taken along lines IV—IV in FIG. 3 and rotated 90°.
Figure 3:
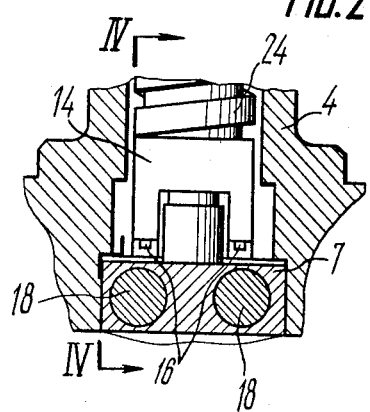
FIG. 3 is a cross-sectional view taken along lines III—III in FIG. 2.

In order to eliminate play, the carriage 7 has to be pressed against the housing 1. For this purpose a hollow fork 14 spring-loaded in the axial direction and coaxial with the housing 1 is interposed between said housing 1 and the rod 12. Axles 15 of rollers 16 are secured at that end of the fork 14 (FIG. 2) which faces the carriage 7. The axles 15 are arranged symmetrically with respect to the axis "a" of rotation of the boring head. The rollers 16 interact with slanted surfaces 17 (FIGS. 3 and 4) of the carriage 7. The slanted surfaces 17 are arranged symmetrically in relation to the axis "a" of rotation of the boring head. The rollers 16 interact with the slanted surfaces 17 on lines found in a plane extending through the axis "a" of rotation of the boring head.

In order to eliminate loads which cause deformation of the rod 12 and housing 1, a counterbalance is provided in the form of a pair of pins 18. These are received in two through holes 19 provided in the carriage 7. The holes 19 are arranged symmetrically with respect to the axis "a" of rotation of the boring head and extend at a perpendicular to said axis "a" of rotation. The pins 18 are mounted for reciprocation in the through holes 19.

Reciprocation of the pins 18 is synchronized, because they are kinematically coupled to the rod 12 by means of helical racks 20 provided on the opposite lateral sides of the rod 12 next to the slanted surface 13. The racks 20 mesh with helical racks 21 provided on the pins 18.

Rotation of the spindle 5 produces centrifugal forces acting on the carriage 7 and pins 18. To equalize these forces, it is necessary that the masses of the carriage 7 and pins 18 and the distances between their centers of gravity and the axis "a" of rotation of the boring head be in inverse proportion to each other. In other words, there must be an inverse proportion between the masses of the carriage 7 and pins 18 and the gear ratios of the pins 18 and the rod 12. A counterbalance in the form of rods 18 is best when their mass is smaller by several times than that of the carriage 7 with an inverse proportion between the gear ratios. Desired gear ratios between the carriage 7 and rod 12 and between the pins 18 and rod 12 are attained by appropriately selecting the angle of inclination of the slanted surface 13 of the rod 12 and the angle of inclination of the teeth of the racks 20 and 21. The total mass of the counterbalance is equally divided between the pins 18 irrespective of their number. The inside of the housing 1 is covered by an enclosure 22 (FIG. 1) and protected by a guard 23 mounted on the carriage 7.

The boring head of a multiple-operation machine tool functions as follows.

The cutting tool 9 is fixed in the mandrel 8 of the boring head which is rotated by the spindle 5. According to the drawing, the rod 12 is in its extreme left position. As the boring head rotates, the rod 12 moves to the right. A spring 24 (FIG. 4) drives the fork 14 to the left. The rollers 16 are brought into an abutting relationship with the slanted surface 17 of the carriage 7, whereby the carriage 7 and mandrel 8 with cutting tool 9 are moved towards the axis "a" of rotation of the boring head. As this takes place, the helical racks 20 of the rod 12 drive the helical racks 21 of the pins 18 in the direction opposite to that of the carriage 7. Thus the boring head of this invention is always properly balanced. This makes it possible to increase the spindle speed without affecting the accuracy of machining.

As the rod 12 moves to the left, the slanted surfaces 17 of the carriage 7 act on the rollers 16 and drive the fork 14 to the right, overcoming the resistance of the spring 24. The counterbalance functions as described above.

What is claimed is:

1. A boring head of a multiple-operation machine tool comprising: a rotatable housing; means for rotating said housing; a rotatable carriage accommodated in said housing and having at least one pair of through holes symmetrically provided in said carriage in relation to an axis of rotation of said housing and extending in a perpendicular direction to said axis of rotation, said carriage being spring-biased to radially move in relation to said housing; a cylindrical finger accommodated in said carriage having a first slanted surface; a mandrel for a cutting tool accommodated in said carriage; a rod kinematically coupled to a drive and having a second slanted surface provided on one end of said rod, said second slanted surface of said rod interacting with said first slanted surface of said finger in said carriage and moving said carriage in a radial direction; means for pressing said carriage against said housing; and at least one pair of pins located in said pairs of said through holes, said pins being kinematically coupled to said rod and moveable in forward and backward directions in said holes.

2. A boring head according to claim 1, wherein said pins are kinematically connected to said rod by helical racks located on said pins and on opposite lateral sides of said rod.

3. A boring head according to claim 2, wherein a gear ratio of a first interacting area of said first slanted surface of said finger of said carriage and said second slanted surface of said rod is lower than a second interacting surface of said helical racks of said pins and said opposite lateral sides of said rod.

* * * * *